United States Patent
Sokoloff

(10) Patent No.: US 6,567,677 B1
(45) Date of Patent: May 20, 2003

(54) NOTEBOOK COMPUTER-TELEPHONE

(76) Inventor: Seth David Sokoloff, 515 N. 9th St., Philomath, OR (US) 97370-9024

( * ) Notice: Subject to any disclaimer, the term of this patent is extended or adjusted under 35 U.S.C. 154(b) by 303 days.

(21) Appl. No.: 09/638,429

(22) Filed: Aug. 14, 2000

(51) Int. Cl.[7] .............................. H04B 1/38; H04M 9/00
(52) U.S. Cl. ..................... 455/575; 455/556; 455/90; 455/350; 379/433.13; 379/433.02
(58) Field of Search .................. 455/90, 575, 556, 455/557, 347, 350, 569; 379/433.02, 433.11, 433.13, 440

(56) References Cited

U.S. PATENT DOCUMENTS

| | | | | |
|---|---|---|---|---|
| 5,491,507 A | * | 2/1996 | Umezawa et al. | 348/14 |
| 5,796,822 A | * | 8/1998 | Larson et al. | 379/433 |
| 5,797,089 A | * | 8/1998 | Nguyen | 455/403 |
| 6,259,932 B1 | * | 7/2001 | Constien | 455/556 |
| 2002/0077145 A1 | * | 6/2002 | Kamiya et al. | 455/550 |

FOREIGN PATENT DOCUMENTS

| | | | | |
|---|---|---|---|---|
| JP | 8-294030 | * | 11/1996 | H04N/5/225 |
| JP | 9-130489 | * | 5/1997 | H04M/3/56 |
| JP | 11-202973 | * | 7/1999 | G06F/1/16 |

* cited by examiner

*Primary Examiner*—Duc Nguyen

(57) ABSTRACT

A notebook computer-telephone includes a body that is comprised of at least two hinged parts, a microphone, a speaker, and a ported speaker cover that is rotatably attached to the body. The cover has at least two useful positions. The first position direct sound from the speaker out of the body when the hinge is closed. In this position the speaker is useful in conjunction with the microphone for telephone use. The second position is useful when the hinge is open, directing sound from the speaker out of the body within the area exposed by the opened hinge. Multiple resting positions created by the hinged structure are useful, especially for speakerphone use. A position of the cover that protects the speaker when the hinge is closed is provided. All three positions are achieved without an impact on the size of the device. A second microphone as well as a camera may be provided for flexibility and videophone use. The speaker and the camera may be mounted in conjunction with the cover.

11 Claims, 2 Drawing Sheets

NOTEBOOK COMPUTER-TELEPHONE

BACKGROUND

1. Field of the Invention

The present invention relates generally to portable computers, specifically one that operates as part of a wireless audio communication network.

2. Discussion of Prior Art

In the emerging field of portable computers that operate as part of a wireless communication network there are two general styles.

One is traditional telephone style, the development of this style includes better visual displays and expanded control functions. The typical feature and benefit of this style is that it is distinctly designed to be held in the users hand, with a speaker of the devise near the users ear, and a microphone directed toward the users mouth. A disadvantage of this style is the limited amount of area that is directed at the user at one time in proportion to the overall size, especially for uses other than as a telephone. Another disadvantage is the lack of useful resting positions and angles when a speakerphone mode is provided, with or without additional speakers. Speakerphone mode is an audio communication mode, useful in this type of device, which does not require placement of the device near the car of the user.

The other style is the small notebook computer, also called a sub-notebook or a palmtop computer. The development of this style includes a wireless connection to a public communication network as well as a speaker, or speaker connection jack, and a microphone, or microphone connection jack. A central hinge typifies the notebook style, with each hinged part containing at least a data entry field or a visual display. This style provides a telephone style use mode only with the addition of a detachable head- or earphone.

Some telephone style devices are also hinged in order to fold for improved portability, and protection of the components. These differ from notebook style in that the data entry field and/or visual display are smaller enabling a telephone use position when the hinge is in open position. In addition, one of the hinged parts commonly bears only a speaker or a microphone. These devices generally share the disadvantages of the traditional telephone style. This style is also commonly shaped to be grasped on very thin sides making it uncomfortable to hold, especially for uses of long duration.

The size of all the above devices is a main concern, for reasons of usability and portability. The area directed at the user during operation is often a determining factor of the size of the data input field, the visual display, or the overall size of the device. Speakers that are directed at the user are beneficial for appropriate public volume level, higher audio quality, and lower power consumption. In summary, devices of this type benefit greatly by maximizing the amount of useful area directed at the user at one time during use in proportion to the overall size.

SUMMARY OF THE INVENTION

In accordance with the present invention a notebook computer-telephone provides a speaker with a rotable ported speaker cover that enables a closed notebook telephone use alignment, an alignment in which the sound from the speaker is directed toward the user during open notebook computer use, and a closed notebook with speaker protected alignment, without changing the overall size and portability of the notebook style device.

OBJECTS AND ADVANTAGES

Accordingly several objects and advantages of the present invention are:

(a) To provide a notebook computer-telephone that functions as a portable personal computer, a cordless telephone, a cordless speakerphone, and as a cordless videophone, without the use of complementary, detachable, or expanding, components.

(b) To provide a compact device for enhanced portability.

(c) To provide a notebook computer-telephone which can be usefully placed on a wide range surfaces when operating in speakerphone mode.

(d) To provide a notebook computer-telephone that provides a solid and comfortable tactile feeling, especially during telephone use.

(e) To provide a notebook computer-telephone that provides a solid and comfortable tactile assembly from the output of the speaker assembly.

Further objects and advantages of the invention will become apparent from a consideration of the drawings and ensuing descriptions.

REFERENCE NUMERALS IN DRAWINGS

Figure 1A:
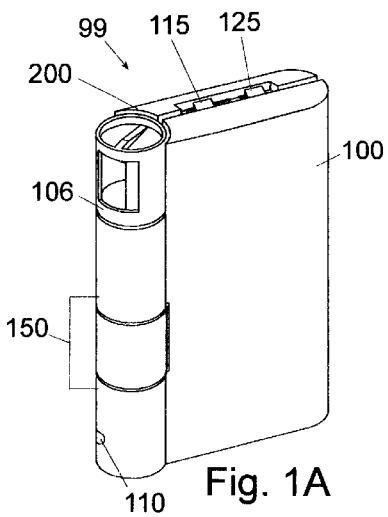
FIG. 1A is a perspective view of embodiment 1 with the hinge in closed position, and the ported speaker cover in telephone use position.

For ease of understanding, corresponding components in different embodiments share reference numerals.

| 99 | body | 100 | part | 105 | speaker |
|---|---|---|---|---|---|
| 106 | cover | 107 | port | 110 | microphone |
| 111 | microphone | 115 | volume control | 25 | power control |
| 130 | visual display | 135 | field | 140 | camera |
| 150 | hinge | 200 | part | 201 | connector |
| 202 | switch | | | | |

DESCRIPTION OF INVENTION

FIGS. 1A to 1D—Embodiment 1

Figure 1B:
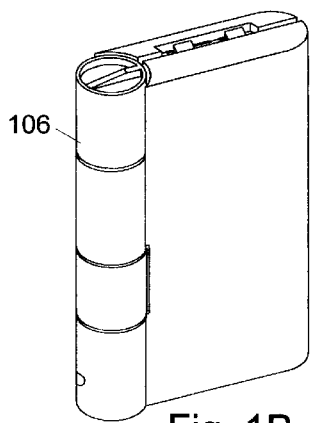
FIG. 1B depicts embodiment 1 from the same perspective, with the ported speaker cover in protective position.
Figure 1C:
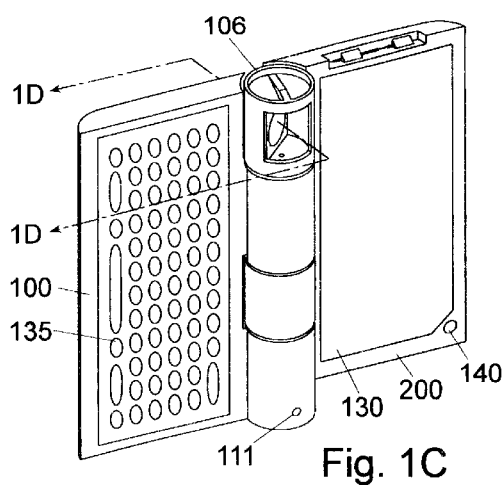
FIG. 1C is a perspective view of embodiment 1 with the hinge in open position, and the ported speaker cover in notebook computer use position.

In FIG. 1A, a notebook computer-telephone has a body 99 comprised of a part 100 and a part 200 which house all of the components for portable computer and communication use. Components and circuits are conventional and only those concerned with the invention are discussed and depicted in detail. A hinge 150 connects parts 100 and 200. Hinge 150 is in closed position. Part 100 houses a speaker 105 (not visible), a rotatable ported speaker cover 106, and a microphone 110, which are located to function together for telephone use with the hinge in closed position. In this embodiment, cover 106 is cylindrical in shape, and the rotational axis of cover 106 is in linear alignment with the axis of hinge 150. A volume control 115, and a power control 125, are also accessible with the hinge in closed position, and are formed to prevent accidental operation. In FIG. 1B cover 106 is shown rotated from the position depicted in FIG. 1A. FIG. 1C depicts the hinge in open position, and another position of cover 106. Part 200 houses a visual display 130, such as a liquid crystal display (LCD), and part 100 houses a manual data entry field 135, such as a keypad, keyboard, or touch sensitive screen. A second microphone 111 is provided for use when hinge 150 is open.

Figure 1D:
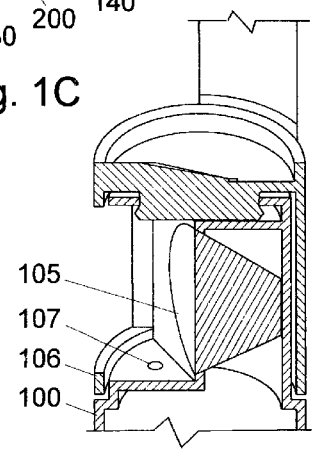
FIG. 1D is a partial cut-away view of embodiment 1, as defined by line 1D—1D in FIG. 1C, at a larger scale.

A switch (not shown) that senses the position of hinge 150 controls which microphone is active for use. A camera 140 is provided. Camera 140 is located in relation to visual display 130 in a way that allows for videophone use. FIG. 1D depicts the rotational union between cover 106 and part 100, the union may be formed by a number of conventional means and is not discussed in detail. A port 107 allows for the sound produced by the rear surface of the speaker to be channeled to the front of the speaker.

Operation of Invention
FIGS. 1A to 1D—Embodiment 1

The device functions, as aligned in FIG. 1A, as a portable telephone. Telephone calls are answered by use of power control 125. Speaker volume is controlled by volume control 115. Telephone numbers may be dialed by voice command, or by opening hinge 150 for access to field 135. At higher audio volume levels the device functions as a speakerphone. The devise can function in this way with the hinge open, or closed, enabling a wide range of useful resting positions when it is not held in the user's hand, to which it is also well suited. This is because it provides a large surface for contact with the hand of the user. Cover 106 may be rotated manually, from the position depicted in FIG. 1A, into the position depicted in FIG. 1B. In this position, cover 106 protects speaker 105 for improved durability. A third position of cover 106 is useful when hinge 150 is opened, as in FIG. 1C, to direct sound between field 135 and visual display 130. This position is useful for applications that make use of sound in conjunction with visual display 130 and/or field 135. The cylindrical interior wall of cover 106 aids in directing sound in a useful direction.

Figure 2:
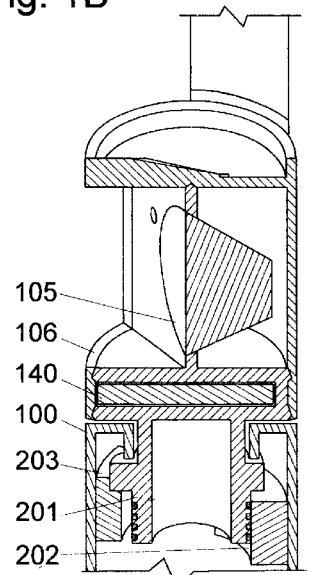
FIG. 2 is a partial cut-away view of embodiment 2, similar to FIG. 1D.

FIG. 2—Description and Operation of Embodiment 2

Embodiment 2 shares the attributes of embodiment 1. FIG. 2 depicts the main differences. Cover 106, speaker 105, and camera 140 are mounted to a connector 201. Connector 201 is rotatably connected to part 100, and provides a rotatable electric connection in conjunction with a connector 202 that is mounted to part 100. Connector 201 has an irregular surface that activates a switch 203 that senses the position of connector 201. This allows cover 106 to replace power control 125. This embodiment provides increased directability of speaker 105, and also increases the usefulness of camera 140.

Figure 3A:
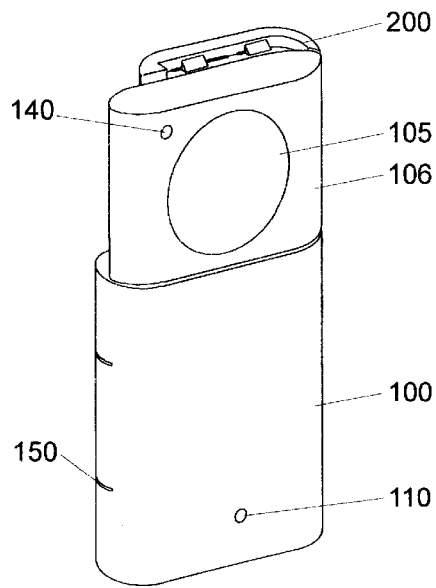
FIG. 3A is a perspective view of embodiment 3 with the hinge in closed position, and the speaker in telephone use position.
Figure 3B:
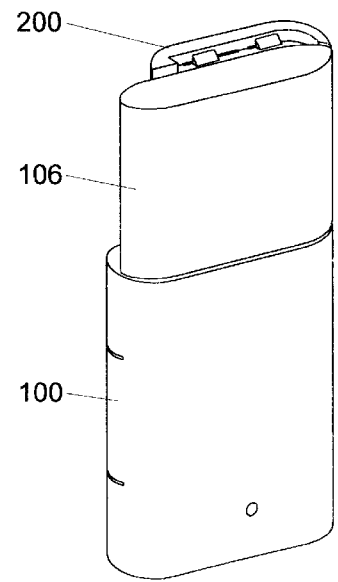
FIG. 3B is a perspective view of embodiment 3 with the hinge in closed position, and the speaker in protected position.

FIGS. 3A and 3B—Description and Operation of Embodiment 3

Figure 3C:
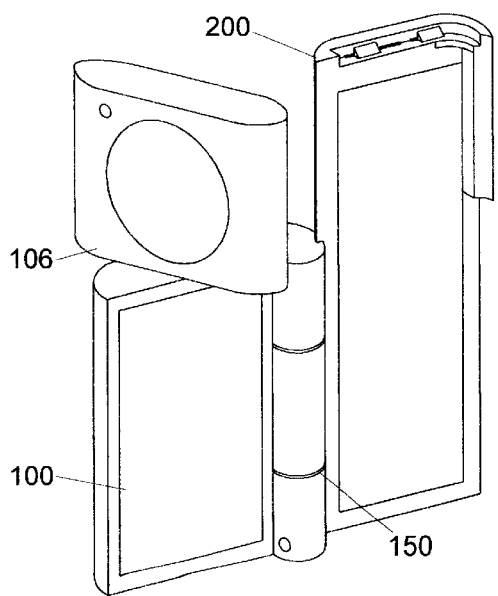
FIG. 3C is a perspective view of embodiment 3 with the hinge in open position, and the speaker in mid-rotation.
Figure 3D:
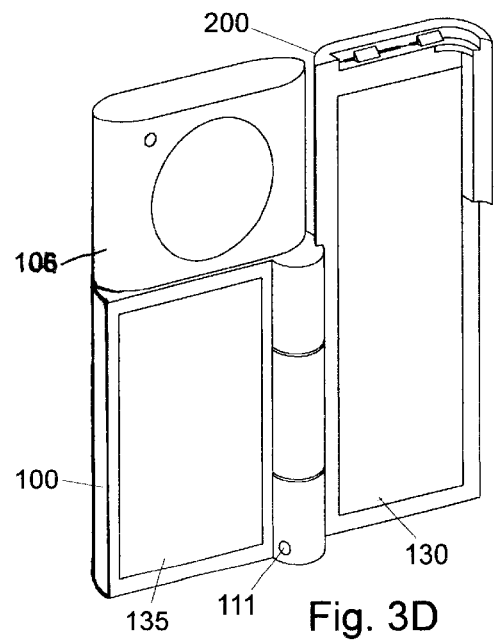
FIG. 3D is a perspective view of embodiment 3 with the hinge in open position, and the speaker in notebook computer use position.

Embodiment 3 shares the attributes of embodiment 2, except that this embodiment exhibits a location for speaker 105, cover 106, and camera 140 that does not share axial alignment with hinge 150. Hinge 150 is of a different form in this embodiment. In FIG. 4A, hinge 150 is in closed position, and speaker 105, cover 106, and microphone 110 are aligned for telephone use. In FIG. 3B, cover 106 has been rotated from the position in FIG. 3A, protecting speaker 105 and camera 140. Hinge 150 must be open to accomplish this rotation, as in FIG. 3C. Cover 106 is shown in mid-rotation. In FIG. 3D hinge 150 is open, and cover 106, speaker 105, microphone 111, and camera 140 are aligned for use concurrently with field 135 and visual display 130. This embodiment allows for uses requiring a larger speaker.

Conclusion, Ramifications, and Scope

Accordingly, the reader will see that a notebook computer-telephone is convenient, easy to operate, and uses space efficiently. Some additional embodiments and features that are considered to fall within the scope of the invention include;

- detents that help maintain the position of the speaker cover,
- a unitary speaker/speaker cover,
- a detachable speaker for earphone use,
- only one microphone,
- a rotatable microphone, that may be linked to speaker cover rotation,
- additional controls, or fields of controls,
- rotation of the speaker port accomplished automatically by movement of the hinge,
- additional speakers,
- additional acoustic ports opened, closed, or otherwise altered by speaker cover rotation.

I claim:

1. A method to direct sound from a speaker of a hinged electronic communication device at least within a hinged area when the hinge is open, and outside of said hinged area when the hinge is closed, by a rotatable ported speaker cover, said cover also providing a position in which the port of said cover is obstructed when the hinge is closed, thereby protecting the speaker, and all of said positions of said cover do not impact the size, or dimensions, of said device.

2. A notebook computer-telephone, comprising:
   signal processing means for permitting at least a vocal communication;
   a body enclosing a central processing unit that processes data;
   said body bearing a manual data input field and a visual display for displaying a plurality of images varying under the control of said field and said central processing unit;
   said body being comprised of at least a first part and a second part;
   a hinge rotatably connecting said first part to said second part, as said second part travels between an open position relative to said field and a closed position with said second part in juxtaposition with and obstructing access to said field;
   a speaker for producing a plurality of sounds; and
   a ported cover for said speaker that is rotatably mounted to said body for sound from said speaker to be channeled out of said body in a plurality of directions, said cover having at least one position in which the port of said cover is unobstructed when said hinge is in closed position; and said cover having at least one position in which the port of said cover is unobstructed when said hinge is in open position; and said cover having at least one position in which the port of said cover is unobstructed when said hinge is in closed position; and all of said positions of said cover do not impact the overall size, or dimensions, of said body.

3. The notebook computer of claim 2, with a microphone mounted in conjunction with said cover.

4. The notebook computer of claim 2, with a camera mounted in conjunction with said cover.

5. The notebook computer of claim 2, with a speaker mounted in conjunction with said cover.

6. The notebook computer of claim 2, with a rotary circuit switching mechanism that is operated by rotation of said cover.

7. A notebook computer-telephone, comprising:

signal processing means for permitting at least a vocal communication;

a body enclosing a central processing unit that processes data;

said body bearing a manual data input field and a visual display for displaying a plurality of images varying under the control of said field and said central processing unit;

said body being comprised of at least a first part and a second part;

a hinge rotatably connecting said first part to said second part, as said second part travels between an open position relative to said field and a closed position with said second part in juxtaposition with and obstructing access to said field;

a speaker for producing a plurality of sounds; and a ported cover for said apeaker that is rotatably mounted to said body for sound from said speaker to be channeled out of said body in a plurality of directions, said cover having at least one position in which the port of said cover is unobstructed when said hinge is in closed position; and said cover having at least one position in which the port of said cover is unobstructed when said hinge is in open position; and said cover having at least one position in which the port of said cover is unobstructed when said hinge is in closed position; and all of said positions of said cover do not impact the overall size, or dimensions, of said body, at least one microphone mounted to said body for sound to be received from the exterior of said body, said microphone located to be unobstructed when said hinge is in closed position;

said cover and said microphone being situated so that vocalizations of the user are receivable by said microphone while the port of said cover is held adjacent to the ear of the user, at least when the hinge is in closed position.

8. The notebook computer of claim 7, with a microphone mounted in conjunction with said cover.

9. The notebook computer of claim 7, with a camera mounted in conjunction with said cover.

10. The notebook computer of claim 7, with a speaker mounted in conjunction with said cover.

11. The notebook computer of claim 7, with a rotary circuit switching mechanism that is operated by rotation of said cover.

* * * * *